(12) United States Patent
Antony

(10) Patent No.: US 11,673,518 B2
(45) Date of Patent: Jun. 13, 2023

(54) ENGINE HARNESS FOR GUIDING A PLURALITY OF CABLES ADJACENT AN INTERNAL COMBUSTION ENGINE

(71) Applicant: DAF Trucks N.V., Eindhoven (NL)

(72) Inventor: Joe Antony, Geldrop (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 17/705,474

(22) Filed: Mar. 28, 2022

(65) Prior Publication Data

US 2022/0306018 A1 Sep. 29, 2022

(30) Foreign Application Priority Data

Mar. 29, 2021 (NL) ...................................... 2027851

(51) Int. Cl.
*B60R 16/02* (2006.01)

(52) U.S. Cl.
CPC ................................ *B60R 16/0215* (2013.01)

(58) Field of Classification Search
CPC ............ B60R 16/0207; B60R 16/0215; H01B 7/0045; H02G 3/04; H02G 3/30; H02G 3/32; H02G 3/0468; H02G 3/0481; H02G 3/0487
See application file for complete search history.

(56) References Cited

U.S. PATENT DOCUMENTS

| | | | |
|---|---|---|---|
| 6,086,037 A | 7/2000 | Nagy et al. | |
| 2013/0292159 A1* | 10/2013 | Morioka | A61J 7/02 700/109 |
| 2016/0149385 A1 | 5/2016 | Yamamoto | |
| 2016/0181776 A1* | 6/2016 | Tsukamoto | B60R 16/0215 174/68.3 |
| 2020/0180527 A1 | 6/2020 | Nishimura et al. | |

FOREIGN PATENT DOCUMENTS

| | | |
|---|---|---|
| DE | 102016108522 A1 | 11/2017 |
| WO | 9910206 A1 | 3/1999 |

OTHER PUBLICATIONS

Dutch Search Report and Written Opinion—App No. 2027851—dated Nov. 9, 2021.

* cited by examiner

*Primary Examiner* — Paresh Paghadal
(74) *Attorney, Agent, or Firm* — Banner & Witcott, Ltd.

(57) ABSTRACT

An engine harness for guiding a plurality of cables adjacent an internal combustion engine operatively connected to an electrical system of a vehicle by said plurality of cables along a cable path between the internal combustion engine and the electrical system, said engine harness substantially manufactured of a polymer foam thereby providing a protective sleeve for the plurality of cables, said engine harness further provided with at least one mount for mounting to the internal combustion engine; wherein the at least one mount comprises a bracket section embedded in the polymer foam of the engine harness and having at least two flanges extending from an outer surface of the engine harness to an interior of the engine harness, and a plug section, having a plug element extending outward from the outer surface of the engine harness along a centerline normal to the cable path, wherein said at least two flanges are arranged for centering the plurality of cables with the cable path in the engine harness; and wherein each flange of the at least two flanges comprises a plurality of elongate slots for providing an interlocking structure that interlocks the mount into the engine harness.

8 Claims, 3 Drawing Sheets

ENGINE HARNESS FOR GUIDING A PLURALITY OF CABLES ADJACENT AN INTERNAL COMBUSTION ENGINE

CROSS-REFERENCE TO RELATED APPLICATIONS

This application claims priority under 35 U.S.C. § 119 to Application NL 2027851, filed Mar. 29, 2021, which is hereby incorporated by reference in its entirety.

FIELD OF THE INVENTION

The invention relates to an engine harness for guiding a plurality of cables adjacent an internal combustion engine of a vehicle.

BACKGROUND OF THE INVENTION

In vehicles, engine harnesses are used to transmit electrical power and control information between electronic components of the internal combustion engine and other parts of the vehicle's electrical system in an organized way. As such, an engine harness can be arranged to provide connections between components such as batteries, engine control units, fuel injectors, fuses, etc.

A known engine harnesses, such as described in U.S. Ser. No. 10/773,664, comprises a protective sleeve with one or more metal plates extending from the sleeve to provide mounts for mounting the engine harness to the internal combustion engine. The protection tubular sleeve is a means of fixing the cable running therethrough. For larger wire harnesses, such a tubular sleeves should comprise many different cables.

Under normal operating conditions such cables may vibrate or move relative to each other, which creates a risk of damaged cables or connectors by excessive loads or fatigue. Secondly, engine compartments are typically crowded and subject to high temperature, which creates a hostile environment for cables connecting the vehicle's electronic components. Besides careful selection of cable material properties in engine harnesses, an additional insolation layer, typically of a foam material can be added around cable bundles to provide additional protection against vibrations, cables rubbing against each other or against other engine parts, and other potential sources of wear. It is essential that, during the manufacturing process of the engine harness, the dimensions and properties of the additional insolation layer are under control, to guarantee that the cable bundles are indeed protected. Also, care should be taken that, under operating conditions, a mounted engine harness including its cables keeps following the prescribed routing, e.g. at safe distances from moving parts and heat sources, while allowing flexibility of movement to account for the vehicle's vibrations.

Especially for vehicles with relatively large internal combustion engines, such as trucks, the distances to be covered by such engine harness having many cables running over a relatively large area, can become relatively large and cable bundles can be relatively heavy, which may require additional design measures to avoid failure in any of the earlier described aspects. Loose connection between electronic components can be detrimental for safety and performance of the vehicle. Therefore, having a protected and organized cable routing plays an important role in maintaining a proper connection between components, regardless of the vehicle's operating conditions.

It is a challenge to provide a mount for an engine harness that not only stabilizes a plurality of cables running therethrough, but also provides an efficient and wear free mounting solution to the engine harness.

To solve these and other disadvantages, it is an object of the present invention to further improve the design of engine harnesses.

SUMMARY OF THE INVENTION

In summary, aspects of the invention pertain to a foam engine harness for guiding a plurality of cables adjacent an internal combustion engine operatively connected to an electrical system of a vehicle by said plurality of cables along a cable path between the internal combustion engine and the electrical system. The engine harness is provided with at least one mount for mounting to the internal combustion engine. The at least one mount comprises a bracket section embedded in the engine harness, having at least two flanges extending from an outer surface of the engine harness to an interior of the engine harness, and a plug section, having a plug element extending outward from the outer surface of the engine harness along a centerline normal to the cable path. The at least two flanges are arranged for centering the plurality of cables with the cable path in the engine harness. Each flange of at the least two flanges comprises a plurality of elongate slots for providing an interlocking structure that interlocks the mount into the engine harness.

By having at least one mount comprising a bracket section with flanges that are arranged for centering the plurality of cables with the cable path in the engine harness, and that comprise a plurality of elongate slots arranged for interlocking the mount with the engine harness, an engine harness is provided that provides a well-defined cable routing during manufacturing of the engine harness, as well as between electronic components of the vehicle under operating conditions involving vibrations and other types of loads.

BRIEF DESCRIPTION OF THE DRAWINGS

The invention will be further elucidated in the figures.

DETAILED DESCRIPTION

Figure 1:
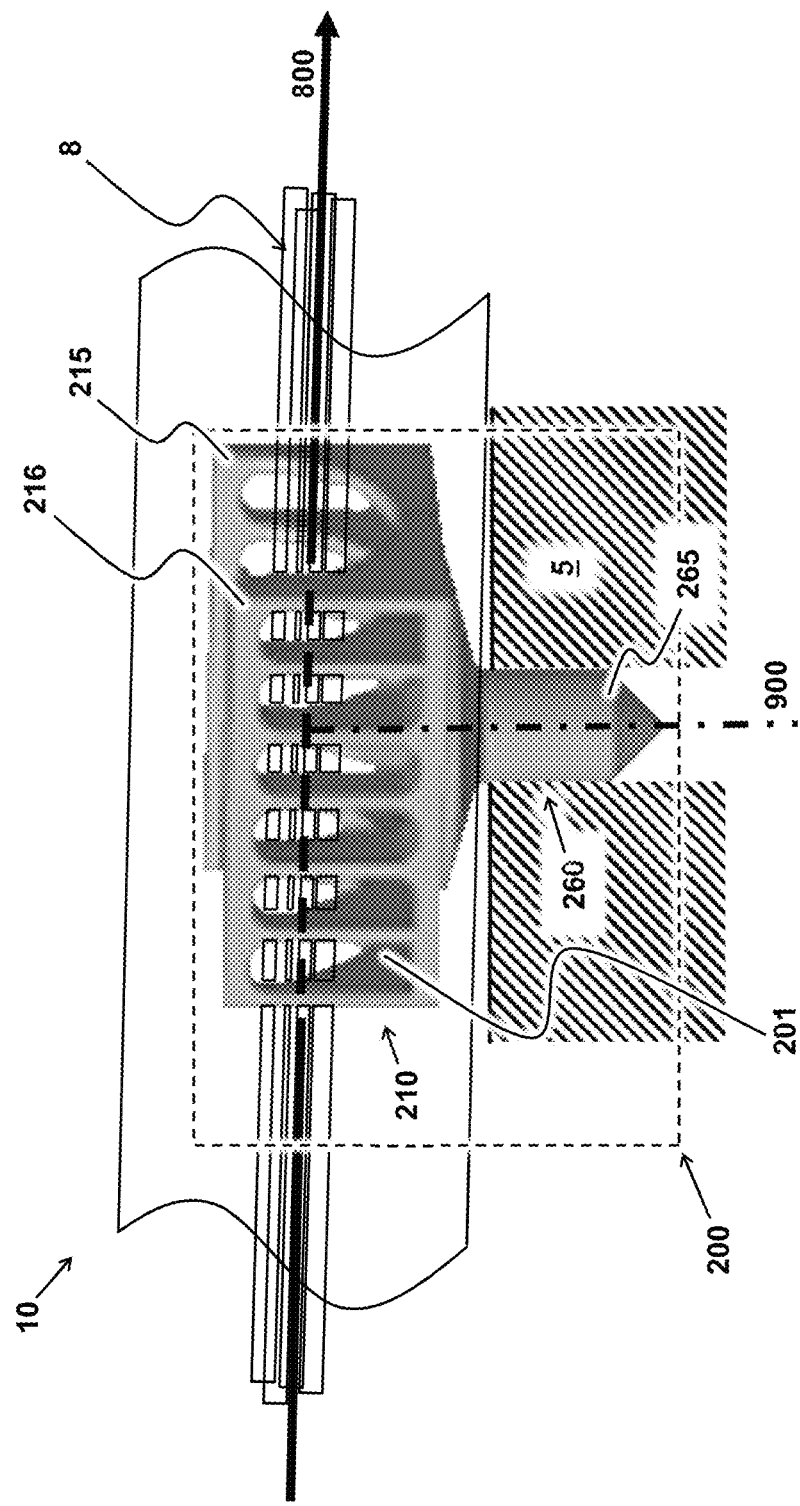
FIG. 1 illustrates a first embodiment of an engine harness 10.

Aspects of the invention relate to a foam engine harness for guiding a plurality of cables adjacent an internal combustion engine operatively connected to an electrical system of a vehicle by said plurality of cables along a cable path between the internal combustion engine and the electrical system, said engine harness provided with at least one mount for mounting to the internal combustion engine, wherein the at least one mount is made of a polymer material and comprises a bracket section embedded in the engine harness, having at least two flanges extending from an outer surface of the engine harness to an interior of the engine harness, and a plug section, having a plug element extending outward from the outer surface of the engine harness along the centerline normal to the cable path, wherein said at least two flanges are arranged for centering the plurality of cables with the cable path in the engine harness. Each flange of the at least two flanges comprises a plurality of elongate slots for providing an interlocking structure that interlocks the mount into the engine harness.

It is known that with increasing number of slots, the interlocking properties between the mount and the engine harness can be improved, however this effect is limited by the manufacturability and the loss of structural integrity of the mount. The present invention provides an engine harness that ensures a well-defined cable routing by comprising at least one mount that i) is arranged for centering the plurality of cables with the cable path, and ii) has a topology designed for manufacturability and which can be optimized for interlocking properties without compromising structural integrity.

In some embodiments, the at least two flanges form a common centering surface arranged for centering the plurality of cables with the cable path, to improve the alignment between the plurality of cables and the cable path.

In further embodiments, the common centering surface matches an outer surface of the plurality of cables, to further improve the alignment between the plurality of cables and the cable path.

In some embodiments, each elongate slot of the plurality of elongate slots comprises a short side oriented parallel to the cable path, and a long side oriented perpendicular to the short side, and the plurality of elongate slots are arranged serially along the cable path, to further improve the interlocking properties by providing a three dimensional interlocking structure that interlocks the mount into the engine harness in a secure fashion.

In other or further embodiments, each elongate slot of the plurality of elongate slots is equal in size, to ensure that the interlocking between the mount and the engine harness is consistent along the cable path.

In some embodiments, the at least one mount comprises a plug section, having a plug element extending outward from the outer surface of the engine harness along a centerline normal to the cable path, to reduce the effect of engine vibrations on the alignment between the plurality of cables and the cable path.

In yet further embodiments, the plug element comprises an outer surface arranged for removably engaging with the internal combustion engine, to facilitate assembly and maintenance of the engine harness.

Optionally, in some embodiments, the plug element comprises a threaded or jagged outer surface, to provide a removable press-fit connection.

In some preferred embodiments, the mount is made of a polymer material, to reduce the weight of the engine harness and to enhance manufacturability.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Now, turning to FIG. 1, an engine harness 10 is shown for guiding a plurality of cables 8, such as power cables for transmitting electrical power or data cables for transmitting data and/or control information between electronic components of a vehicle, adjacent an internal combustion engine 5 of the vehicle, such that the internal combustion engine is operatively connected to an electrical system of the vehicle by said plurality of cables 8, along a cable path 800 between the internal combustion engine 5 and the electrical system.

Cable path 800 may comprise a path for a plurality of cables forming a connection between any number of electronic components, such as a path comprising a plurality of branches for organizing bundled cable routings to establish a combination of parallel or serial connections between electronic components in multiple locations, or a dedicated cable path for a plurality of cables connecting a single pair of electronic components.

Engine harness 10 is provided with at least one mount 200 for mounting to the internal combustion engine 5. For example, engine harness 10 is provided with between two and eight mounts 200, or more, in dependence of the number of electronic components, the relative distance between the electronic components, and the complexity of the cable path 800. Preferably, engine harness 10 is provided with between two and ten mounts 200.

Mount 200 comprises a bracket section 210 that is embedded in the engine harness 10 and that has at least two flanges 215, 216. Bracket section 210 can contain any number of flanges suitable for guiding and centering the plurality of cables 8 along cable path 800. For example, more than two flanges can be used to center the plurality of cables 8 along cable path 800 while the plurality of cables 8 are split into separate cable bundles, or into individual cables, that run adjacent to each other, e.g. to reduce electromagnetic interference between cables or cable bundles, or to improve cable management and serviceability.

Flanges 215, 216 extend from an outer surface of the engine harness 10 to an interior of the engine harness 10. As shown in FIG. 1, flanges 215, 216 of bracket section 210 do not extend outside of engine harness 10, but rather bracket section 210 is preferably completely embedded in engine harness 10, to ensure proper fixation of mount 200 into engine harness 10.

As shown in FIG. 1, mount 200 comprises a plug section 260, e.g. for mounting to internal combustion engine 5. Plug section 260 has a plug element 265 extending outward from the outer surface of engine harness 10 along a centerline 900 normal to cable path 800. This can reduce the effect of engine vibrations on the alignment between the plurality of cables 8 and cable path 800, because the forces on the plurality of cables 8 caused by engine vibrations are perpendicular to cable path 800 and therefore have a limited effect on the centering of the plurality of cables 8 by the at least two flanges 215, 216, which extend into engine harness 10. The orientation of centerline 900 relative to bracket section 210 can also be at another angle, e.g. at an angle between 0 and 90 degrees, such as 45 degrees or 60 degrees, in dependence of the orientation of cable path 800 relative to the internal combustion engine, to compensate for local angular offsets. Flanges 215, 216 are arranged for centering the plurality of cables 8 with cable path 800 in engine harness 10. Each flange 215, 216 comprises a plurality of elongate slots 201, for providing an interlocking structure that interlocks the mount 200 into the engine harness 10, e.g. each of mount 200 and engine harness 10 anchoring into or engaging with the other. Each flange 215, 216 can comprise any suitable number of elongate slots, e.g. in dependence of the size of the elongate slot relative to the size of the flange.

Figure 2:
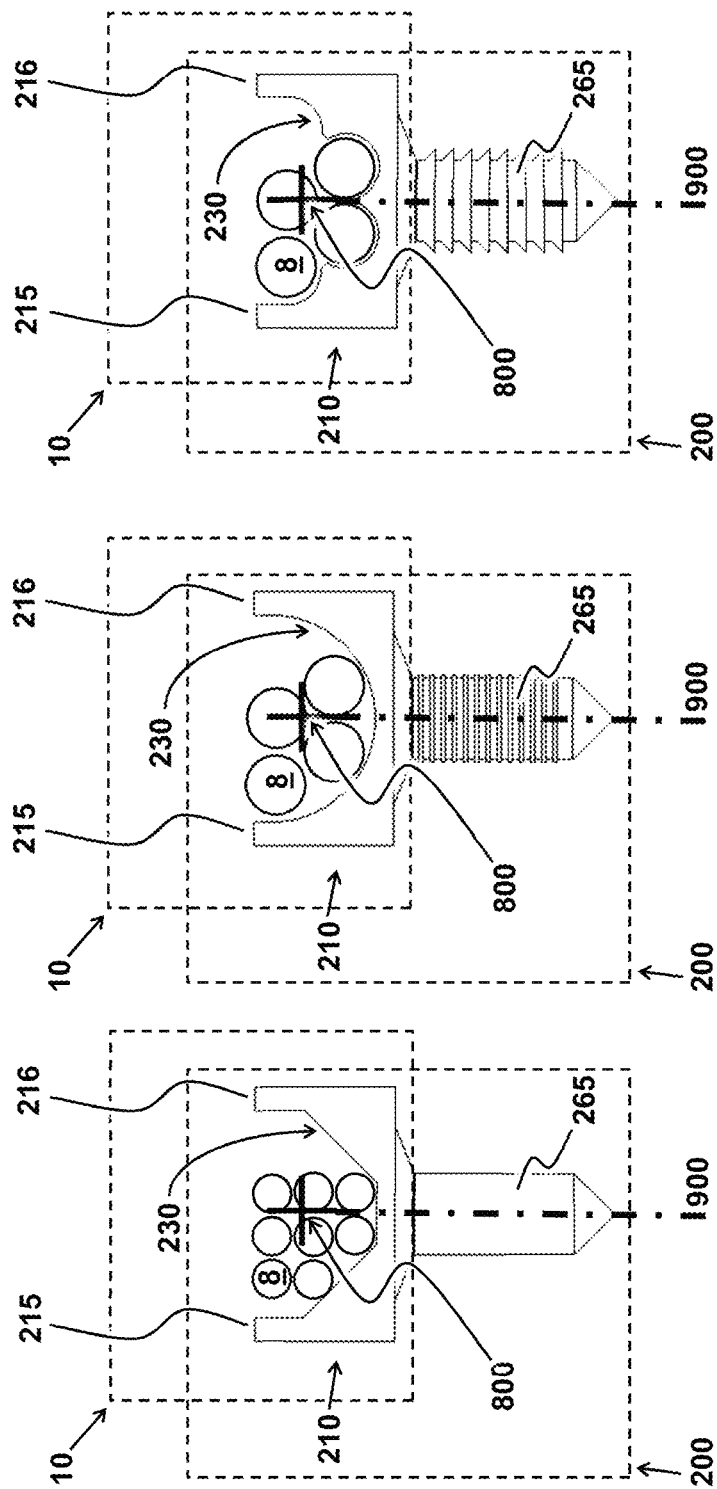
FIGS. 2A-C provide other or further embodiments of engine harness 10.

FIGS. 2A-C illustrate other or further embodiments of engine harness 10. Here, the at least two flanges 215, 216 form a common centering surface 230 arranged for centering the plurality of cables 8 with cable path 800. As shown in the exemplary embodiments of FIGS. 2A-C, common centering surface 230 matches an outer surface of the plurality of cables 8. For example, common centering surface 230 in FIG. 2A comprises a number of straight and angled surfaces arranged for centering the plurality of cables 8 by having a normal oriented towards cable path 800. In the example shown in FIG. 2B, common centering surface 230 comprises a curved surface. The curvature can e.g. cylindrical, parabolical, or any other curved shape comprising multiple radii or varying degrees of curvature. As another example, FIG. 2C shows how flanges 215, 216 can be arranged to form a common centering surface 230 comprising a more complex shape, which matches the outer surface of the plurality of cables by having multiple cutouts corresponding with the diameter of individual cables or cable bundles. Alternatively, in other embodiments not shown in the figures, the at least two flanges 215, 216 can be arranged with other types of common centering surfaces 230 for centering the plurality of cables 8 along cable path 800, such as straight or rectangular surfaces. For example, two flanges may form a ring surrounding the plurality of cables at least partially along cable path 800, to provide additional centering stability when required.

Preferably, plug element 265 comprises an outer surface arranged for removably engaging with the internal combustion engine, such that mount 200 and engine harness 10 can be removed from the internal combustion engine, e.g. for service and maintenance purposes. For example, plug element 265 can comprise an outer diameter corresponding with an inner diameter of the internal combustion engine to provide a steady press-fit that can also be disassembled without damage. Plug element 265 may comprise a roughened outer surface for additionally providing mechanical locking properties, or may comprise flexible elements such as elongate slots, e.g. arranged along centerline 900, such that plug element 265 is inserted into a hole of the internal combustion engine with a given diameter in a compressed state, with a smaller diameter, and released to an expanded state, with a larger diameter, to provide mechanical engagement. The mechanical engagement can in turn be cancelled by bringing plug element 265 back from the expanded state into the compressed state. This can for instance be done by a wedge mechanism, or by elastic or plastic deformation of (parts of) plug element 265.

Figure 3:
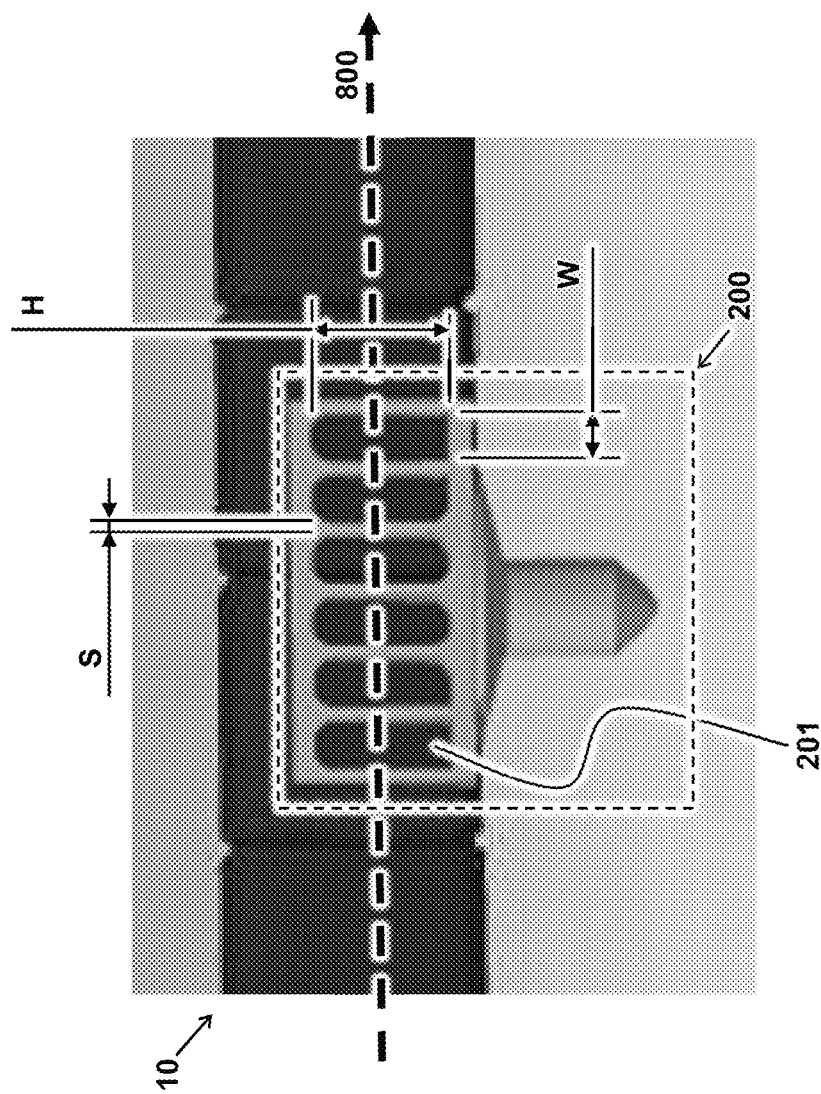
FIG. 3 provides another or further embodiment of engine harness 10.

Preferably, as shown in FIGS. 2B and 2C, plug element 265 comprises a threaded or jagged outer surface, to provide a removable press-fit connection FIG. 3 provides another or further embodiment of engine harness 10. As shown, each elongate slot 201 of the plurality of elongate slots comprises a short side, having a width W, oriented parallel to cable path 800, and a long side, having a height H, oriented perpendicular to the short side. The plurality of elongate slots are arranged serially along cable path 800.

Although not shown in any of the figures, opposing sides of each elongate slot 201 of the plurality of slots, e.g. two short sides or two long sides, may run parallel to each other or at an angle, forming a trapezoid form. Each elongate slot 201 can have a substantially rectangular form, with clear distinctions between short sides and long sides, or a substantially ellipsoid form, wherein a distinction between sides is more difficult to make. Each elongate slot 201 of the plurality of slots may also have an open structure, e.g. having one or more short sides or long sides open, with the opening either towards another elongate slot 201 or towards engine harness 10.

Preferably, as shown in FIG. 3, each elongate slot 201 of the plurality of elongate slots is equal in size, e.g. each elongate slot 201 of the plurality of elongate slots having a long side which is equal in height H and a short side which is equal in width W relative to other elongate slots of the plurality of elongate slots.

Preferably, the spacing S between each elongate slot 201 of the plurality of elongate slots is equal in distance. For example, the spacing S between adjacent elongate slots is uniform along cable path 800. Alternatively, the spacing S may vary along cable path 800. The magnitude of spacing S can e.g. be chosen in dependence of material properties of mount 200 and or of engine harness 10, in dependence of interlocking properties between mount 200 and engine harness 10, or in dependence of the manufacturing process of mount 200 or engine harness 10.

In preferred embodiments, mount 200 is made of a polymer material, to improve manufacturability of mount 200, e.g. by die casting or injection molding, and to reduce the weight of mount 200 as well as engine harness 10. Preferably, the polymer material is a material with relatively high strength and melting point characteristics, such as a polyamide or polyimide material, to be suitable for mounting to the internal combustion engine 5.

It has been found that the optimized topology as proposed in the present invention, simultaneously strengthens the interlocking properties between mount 200 and engine harness 10 and centers a plurality of cables along cable path 800, while inherently reducing the effect of external vibrations and other loads on said interlocking and centering properties. Therefore, these properties, which would normally require use of relatively high strength materials, such as steel, can now be achieved with relatively low strength materials, such as polymers, with advantages regarding e.g. manufacturability, weight, cost reduction, insulation properties, corrosion resistance, etc.

Preferably, engine harness 10 is substantially made of a polymer foam. Due to their composition, polymer foams can provide a barrier at least partially surrounding the plurality of cables, e.g. in the form of a tube, that provides electrical insolation as well as mechanical damping against engine vibrations and other external loads. Advantageously, polymer foams are light weight and can be die cast into a preferred shape.

For example, during a die casting manufacturing process of engine harness 10, at least one mount 200 can e.g. be mounted in a mold at a predefined location matching a mounting location on the internal combustion engine, and oriented along the cable path. Next, a plurality of cables is laid out on the at least one mount 200 in the mold and centered along the cable path by the at least two flanges of the mount 200. This ensures that the plurality of cables are aligned along the cable path during the casting process of the polymer foam in liquid form, which flows into the plurality of elongate slots. After curing of the polymer foam, an interlocking structure is created between the polymer foam and mount 200, while the plurality of cables are centered in the polymer foam of engine harness 10.

As such, the present invention beneficially provides a repeatable manufacturing process for an engine harness, in which the plurality of cables are well centered along a predefined cable path and in which the mounts are securely interlocked with the engine harness.

The invention claimed is:

1. An engine harness for guiding a plurality of cables adjacent an internal combustion engine operatively connected to an electrical system of a vehicle by said plurality of cables along a cable path between the internal combustion engine and the electrical system, said engine harness substantially manufactured of a polymer foam thereby providing a protective sleeve for the plurality of cables, said engine harness further provided with at least one mount for mounting to the internal combustion engine;
   wherein the at least one mount comprises a bracket section embedded in the polymer foam of the engine harness and having at least two flanges extending from an outer surface of the engine harness to an interior of the engine harness, and a plug section, having a plug element extending outward from the outer surface of the engine harness along a centerline normal to the cable path, wherein said at least two flanges are arranged for centering the plurality of cables with the cable path in the engine harness; and
   wherein each flange of the at least two flanges comprises a plurality of elongate slots for providing an interlocking structure that interlocks the mount into the engine harness.

2. The engine harness according to claim 1, wherein the at least two flanges form a common centering surface arranged for centering the plurality of cables with the cable path.

3. The engine harness according to claim 2, wherein the common centering surface matches an outer surface of the plurality of cables.

4. The engine harness according to claim 1, wherein each elongate slot of the plurality of elongate slots comprises a short side oriented parallel to the cable path, and a long side oriented perpendicular to the short side, and wherein the plurality of elongate slots are arranged serially along the cable path.

5. The engine harness according to claim 1, wherein each elongate slot of the plurality of elongate slots is equal in size.

6. The engine harness according to claim 1, wherein the plug element comprises an outer surface arranged for removably engaging with the internal combustion engine.

7. The engine harness according to claim 6, wherein the plug element comprises a threaded or jagged outer surface.

8. The engine harness according to claim 1, wherein the mount is made of a polymer material.

* * * * *